(12) United States Patent
Begis

(10) Patent No.: US 6,907,034 B1
(45) Date of Patent: Jun. 14, 2005

(54) OUT-OF-BAND SIGNALING FOR NETWORK BASED COMPUTER SESSION SYNCHRONIZATION

(75) Inventor: Glenn Begis, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/289,305

(22) Filed: Apr. 8, 1999

(51) Int. Cl.[7] .......................... H04L 12/66; H04L 12/28; H04L 12/56
(52) U.S. Cl. ....................... 370/354; 370/352; 370/400; 370/401
(58) Field of Search ................................ 370/351–356, 370/400–401, 238, 392, 410, 522

(56) References Cited

U.S. PATENT DOCUMENTS

| | | | | |
|---|---|---|---|---|
| 5,222,136 A | * | 6/1993 | Rasmussen et al. | 380/266 |
| 5,608,786 A | * | 3/1997 | Gordon | 379/100 |
| 5,642,397 A | * | 6/1997 | Agbaje-Anozie | 370/313 |
| 5,726,984 A | * | 3/1998 | Kubler et al. | 370/349 |
| 5,917,817 A | * | 6/1999 | Dunn et al. | 370/352 |
| 5,987,129 A | * | 11/1999 | Baba | 380/279 |
| 6,078,579 A | * | 6/2000 | Weingarten | 370/352 |
| 6,122,255 A | * | 9/2000 | Bartholomew et al. | 370/237 |
| 6,304,659 B1 | * | 10/2001 | Gold et al. | 380/239 |
| 6,324,280 B2 | * | 11/2001 | Dunn et al. | 379/230 |
| 6,389,005 B1 | * | 5/2002 | Cruickshank | 370/352 |
| 6,393,460 B1 | * | 5/2002 | Gruen et al. | 709/204 |
| 6,434,378 B1 | * | 8/2002 | Fougnies | 455/406 |
| 6,584,094 B2 | * | 6/2003 | Maroulis et al. | 370/352 |
| 6,603,857 B1 | * | 8/2003 | Batten-Carew et al. | 380/44 |

* cited by examiner

*Primary Examiner*—Chi Pham
*Assistant Examiner*—Ronald Abelson
(74) *Attorney, Agent, or Firm*—Fish & Richardson P.C.

(57) ABSTRACT

Establishing a network connection. In one aspect, establishing a network connection includes: establishing a connection across a first communication network that carries audio signals; encoding a computer network address for a specified network different from the first network into an encoded network address and sending the encoded network address across the first network; and using the network address to establish a network connection on the second network. In one implementation, network connectivity functionality of a computer can be automatically accessed using telephone connectivity. Out-of-band signaling provides a spontaneous network collaboration capability by sending an Internet protocol ("IP") address across a public switched telephone network ("PSTN") connection.

20 Claims, 7 Drawing Sheets

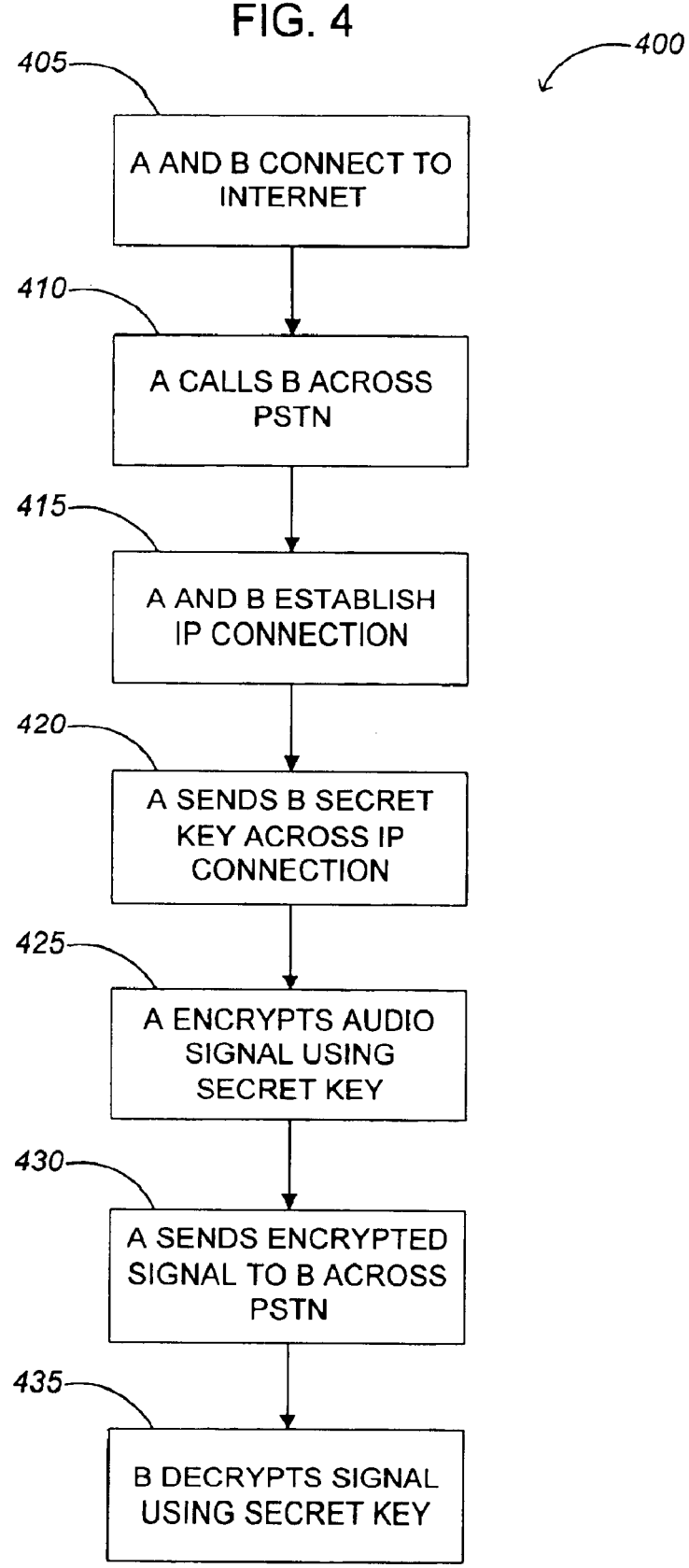

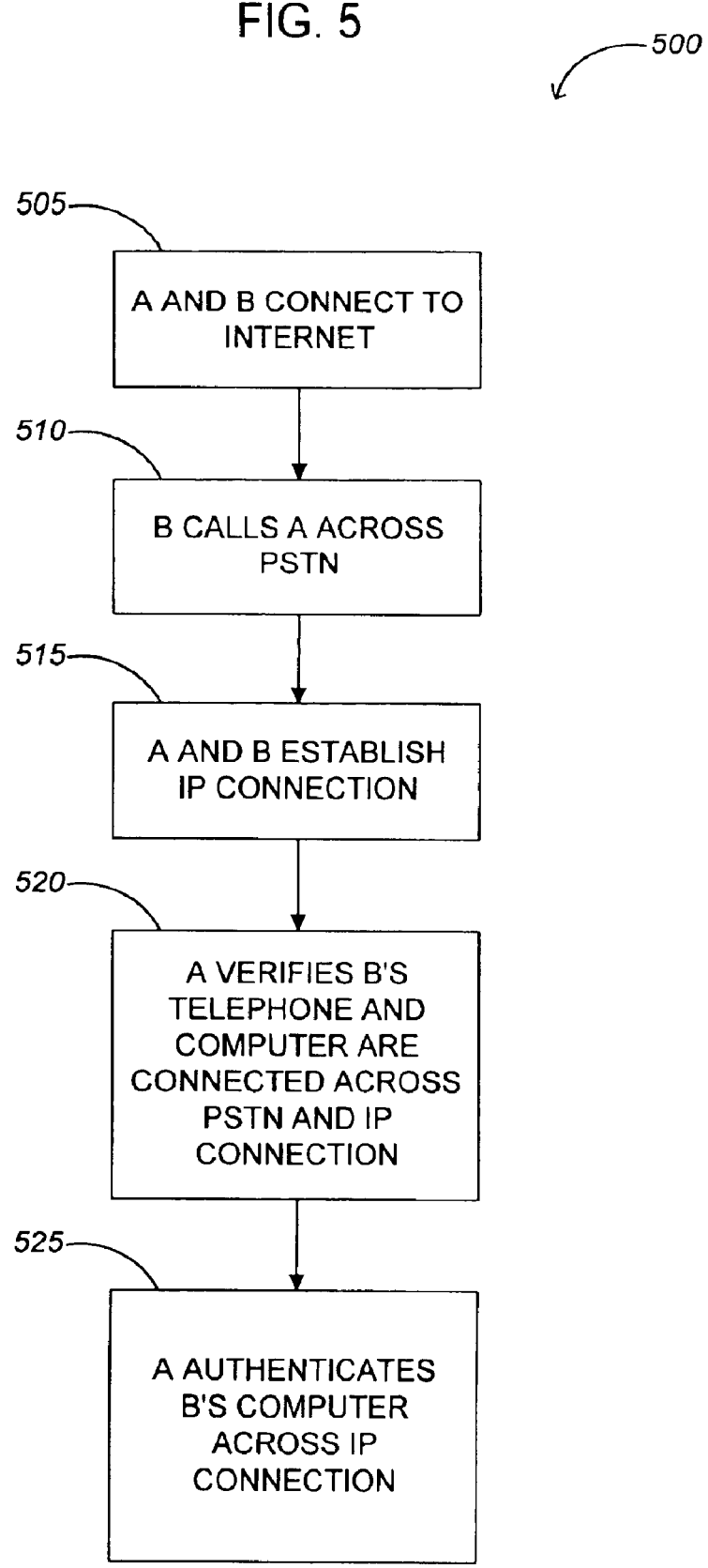

OUT-OF-BAND SIGNALING FOR NETWORK BASED COMPUTER SESSION SYNCHRONIZATION

BACKGROUND

The present disclosure relates to simultaneous use of two separate networks, and the leveraging of connectivity on one network to create a logical connection on the second network.

An Internet protocol ("IP") address is used alone, or in conjunction with software endpoints called ports, by applications and communication stacks to establish an Internet connection between two intelligent devices such as computers. The IP address for a computer can be static or assigned dynamically when the computer connects to an intranet or the Internet. A dynamic IP address can change each time the computer connects to an intranet or the Internet.

An IP connection is established after one of the computers discovers the other computer's IP and port addresses before establishing the IP connection. A computer can publish its IP and port addresses in a known location with a known IP address so that another computer can access the first computer's IP and port addresses. These known locations are sometimes referred to as "buddy lists". This method of establishing an IP connection employs a pre-arranged agreement to establish the connection.

SUMMARY

The present disclosure describes methods and apparatus for establishing a network connection. In one aspect, establishing a network connection includes: establishing a connection across a first communication network that carries audio signals; encoding a computer network address for a specified network different from the first network into an encoded network address and sending the encoded network address across the first network; and using said network address to establish a network connection on said second network. In one implementation, network connectivity functionality of a computer can be automatically accessed using telephone connectivity. Out-of-band signaling provides a spontaneous network collaboration capability by sending an Internet protocol ("IP") address across a public switched telephone network ("PSTN") connection.

In another aspect, Internet connectivity provides privacy across a telephone network through encryption including: establishing a connection across a voice communication network between a first party and a second party; establishing a connection across a computer network between the first party and the second party; transmitting an encryption key across the computer network so that both said first and second parties have said encryption key; encrypting an audio signal using the encryption key; and transmitting the encrypted audio signal across the voice telephone network.

In another aspect, Internet connectivity provides identity authentication of a party to a telephone connection including: establishing a connection across a voice communication network between a calling telephone and a receiving telephone; establishing a connection across a computer network between a calling computer and a receiving computer; and verifying that the calling computer is coupled to the calling telephone by sending a signal from the receiving telephone to the calling telephone across the voice communication network and sending the signal from the calling computer to the receiving computer across the computer network.

In another aspect, a crossbar switch provides dynamic allocation of audio input signals and output signals in a computer system and across a network or networks. The crossbar switch includes: a plurality of input ports, where one input port is coupled to an audio source; a plurality of output ports, where one output port is coupled to a telephone network, and one output port is coupled to a computer network; and a control element which physically connects at least one input port to at least one output port and can dynamically change which input port is coupled to which output port. The switch can be implemented in hardware or software, or a combination of both.

BRIEF DESCRIPTION OF THE DRAWINGS

FIG. 4 is a flowchart of encrypting an audio signal sent over a telephone network, such as the PSTN, using a computer network connection, such as an IP connection.

FIG. 5 is a flowchart of authenticating a caller during a telephone connection across a telephone network, such as the PSTN, using a computer network connection, such as an IP connection.

DETAILED DESCRIPTION

Figure 1:
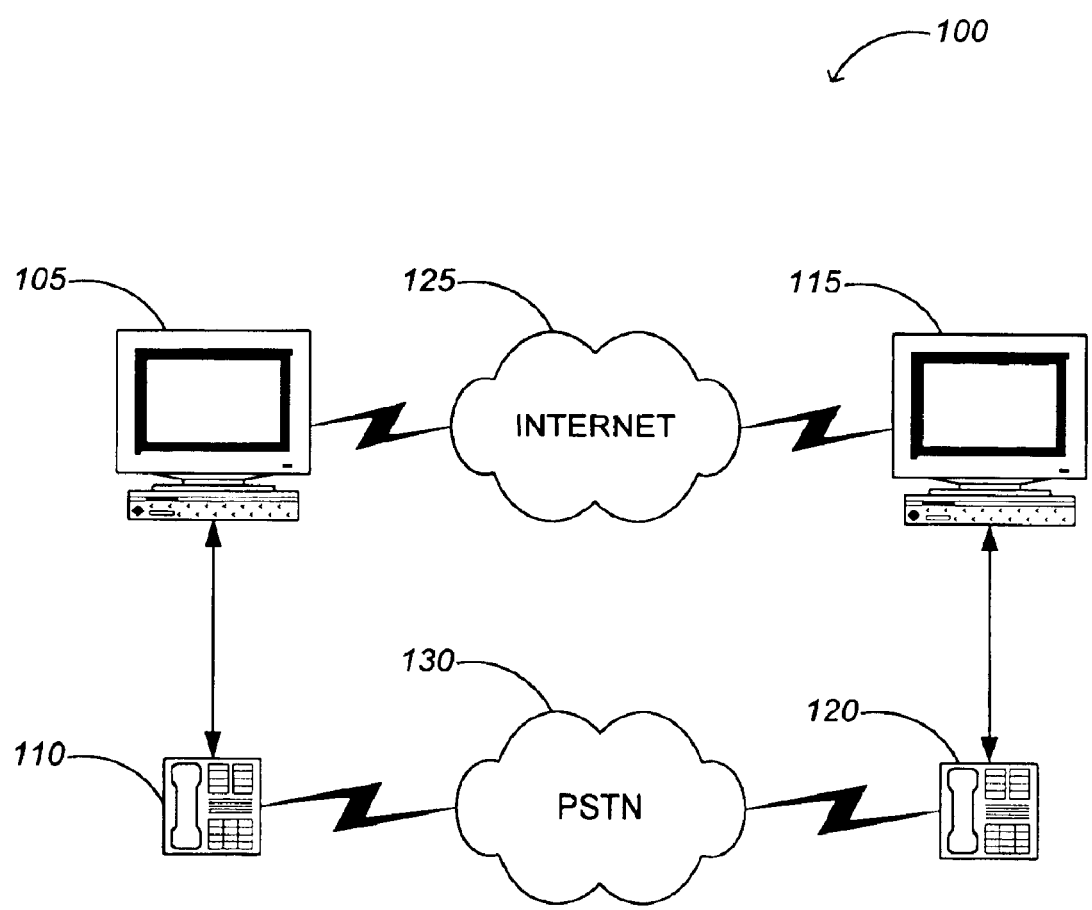
FIG. 1 shows a block diagram of two computers coupled to respective telephones and interconnected by a computer network and a telephone network.

FIG. 1 shows a block diagram 100 of an out-of-band signaling system. A first computer 105 is coupled to a first telephone 110 through a path 107 that allows audio signals and/or data to be exchanged between computer 105 and telephone 110. A second computer 115 is coupled to a second telephone 120 through a path 117 that allows audio signals and data to be exchanged between computer 115 and telephone 120. Computers 105 and 115 can be conventional desktop computers, lean clients, web phones, or workstations. Telephones 110 and 120 can be analog or digital and can be separate from or part of computers 105 and 115, respectively. In one implementation, application programs or agents (e.g., software routines that wait in the background and perform an action when a specified event occurs) executing on computers 105 and 115 can monitor analog and/or digital signals sent to telephones 110 and 120, respectively.

Computers 105 and 115 are connected to a computer network 125. Computer network 125 can be an Internet protocol ("IP") network, such as the global Internet or an intranet. In one implementation, computers 105 and 115 are connected to the Internet logically independent of the telephones' PSTN network connections, such as by a xDSL phone line, a cable modem connection, ISDN connection, Internet accessible LAN connection, or second POTS line.

Telephones 110 and 120 are connected to a communication network 130, e.g., a voice telephone network such as a public switched telephone network ("PSTN", or plain old telephone service network, "POTS") of a private branch exchange ("PBX"). The connections to telephone network 130 can be analog and/or digital, depending upon the nature of telephones 110 and 120 and any equipment such as PBXs which might be in the connection path.

Computers 105 and 115 can be used to augment the telephone communications by leveraging their connections to computer network 125 and telephone network 130. While users are talking across telephone network 130 using telephones 110 and 120, they can automatically (e.g., by using the computers to establish a computer network connection) and spontaneously (e.g., without pre-arrangement between the users) across functionality provided by applications running on computers 105 and 115 by utilizing computer network 125. By accessing both the telephone connection and the computer network connection, the users can work together (e.g., collaborate) across both connections.

Users can access spontaneous network collaboration during a telephone connection by sending a computer network address across the communication network 130 which is different than the computer network connection. This can be done, for example, by a touch tone Dual Tone Multi Frequency (DTMF) sequence, a modem sequence or by transmitting the data network address with the caller ID. The computer network address information is sent across a different network than the computer network and so is "out-of-band" relative to the computer network. In one implementation, the system used is automatic and done with reduced negotiation time faster than training sequences.

Training is an initial connection process a modem receiver uses to synchronize to a remote modem's transmit signal. Training may also occur during a connection usually to correct for extreme disruptions such as line outages or bursts of line noise. Training is actually the result of many interim tasks a modem performs to make a connection, such as automatic gain control adjustment, receiver timing acquisition, half-duplex equaliser convergence, echo cancellation convergence, full-duplex echo cancellation, equalizer convergence, and more. These tasks all occur during the initial handshake of the connection. During training, no data is transmitted, so from an application perspective it's lost time. A conventional fast train sequence can last about seven seconds.

The recipient uses this computer network address to establish a substantially simultaneous and related connection across computer network 125, e.g., via the Internet. This connection provides users with the ability to spontaneously access computer network connectivity and computer functionality, such as for a graphical link to access network collaboration software, simultaneously with a telephone connection. One example of collaboration software is a synchronized web browser, where one party's navigation of the web drives the navigation of the web of the other party. Another example is video conferencing, where the PSTN's ability to provide a high quality of service complements by video transmitted over the Internet. This technique provides benefits such as: lowered complexity of using a computer, software applications, and the Internet to enhance phone conversations through automatic connection, voice enabled computer collaboration without audio quality problems associated with Internet telephony, spontaneous connection without requiring a directory service to keep track of dynamic or unknown IP addresses.

Computers 105 and 115 can also be configured with crossbar switches (e.g., N×N switches) to dynamically allocate audio input ports and output ports during a telephone connection, as described below. A user can connect one or more input ports to one or more output ports and change these connections without terminating the telephone connection. The crossbar switches allow users to dynamically set up and tear down connections between input ports and output ports in real-time. This allows a single device to be used for multiple speech interactions, such as telephony over the PSTN, Internet telephony, web-to-phone communications established through a remote web site, and local or remote voice control of a computer. Application programs executing on a computer can monitor audio signals on a connected PSTN line or Internet telephonic connection. The switch can also provide a uniform audio interface for application vendors independent of devices and connection media.

Users can enhance privacy of communications across a telephone connection by using the computer to encrypt audio signals (e.g., electrical signals representing audible sounds) before transmission. Users establish a telephone connection and a computer network connection. A user at telephone 110 sends a secret key across computer network 125. The user then encrypts audio signals using computers 105 and sends the encrypted signals across telephone network 130. The recipient decrypts the signal using computer 115. This encryption provides cost-effective crypto-phone capabilities and enhanced security by utilizing, for example, computer processing power, computer security features such as random number generators, private/public key pairs, and hidden execution capabilities.

Users can also enhance telephone communications by authenticating the identity of a caller using computer network 125 and telephone network 130, in applications such as commercial transactions. Users establish a telephone connection and a computer network connection. A user at telephone 110 sends a secret key generated by 105 across telephone network 130 using a mechanism such as DTMF to a user at telephone 120. The user at telephone 120 returns the secret key across computer network 125. The computer at telephone 110 verifies that the received secret key is the same as the secret key originally sent. This verification confirms that telephone 120 is coupled to computer 115. The users can then use conventional digital certification techniques to verify the identity of computers 105 and 115. By verifying the connection between telephone 120 and computer 115, the user at telephone 110 can attribute to the user at telephone 120 the level of trust provided by the identification credentials stored on, or transmitted via computer 115. Mechanisms to ascertain the validity of the credentials can proceed using the Internet, as if the transaction were initiated on the computer using the Internet.

The configuration shown in FIG. 1 can also be implemented in various alternative ways. Computers 105 and 115 can be coupled directly to telephone network 130 via a PBX, key system, or cellular network. Computers 105 and 115 can be individually connected to computer network 125, or collectively with other computers via a local or wide area network ("LAN" or "WAN"). Computers 105, 115 and telephones 110, 120 can be connected to computer network 125 and telephone network 130 through digital subscriber line ("DSL" or "xDSL") connections. An xDSL connection provides two logical signal paths across a signal physical line. Hence, computer 105 and telephone 110 can share a single physical connection to telephone network 130. Computer 105 can access computer network 125 through a PoP connection to the Internet. In addition, more than two computers and telephones can be connected, such as in a conference call.

Figure 2:
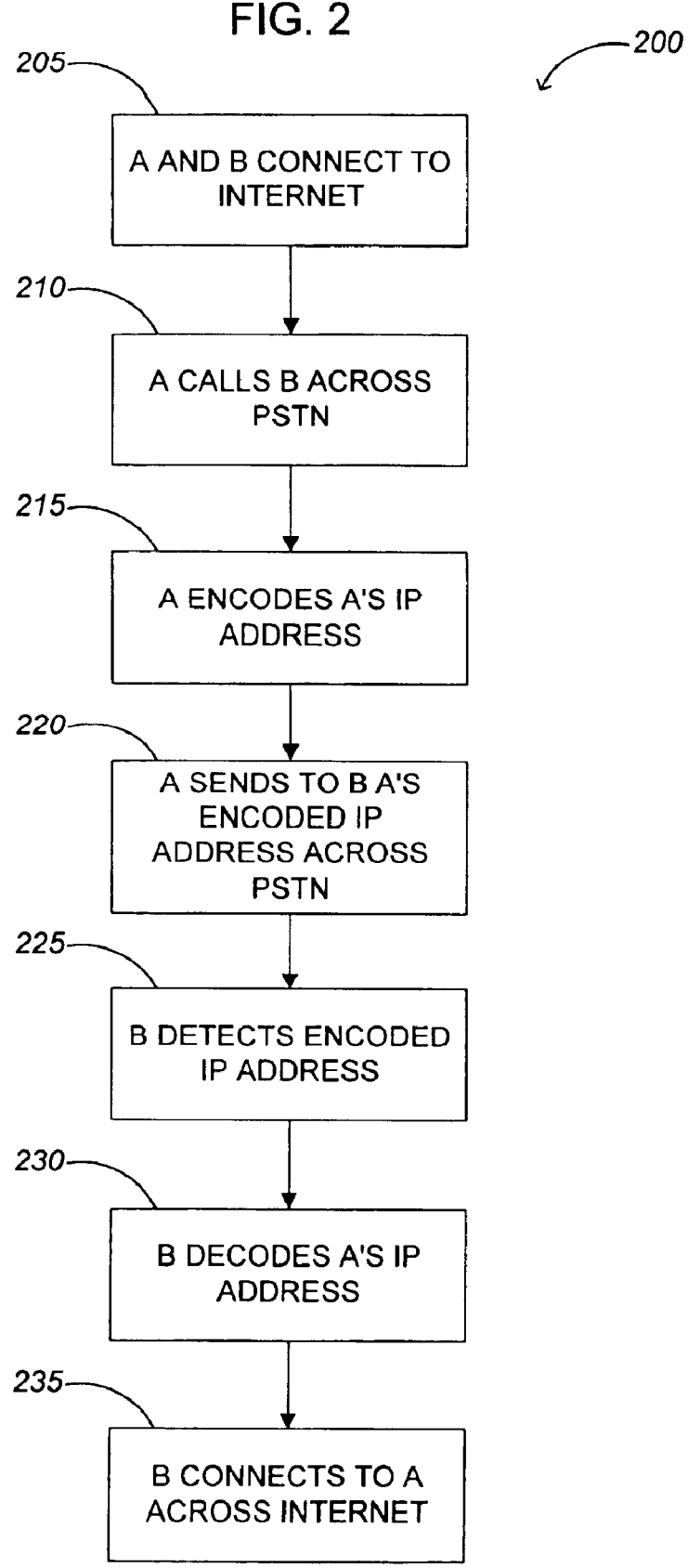
FIG. 2 is a flowchart of spontaneously establishing an IP connection between users using the PSTN and the configuration shown in FIG. 1.

FIG. 2 is a flowchart 200 showing the operations of spontaneously, e.g., without previous arrangements, establishing an IP connection between computers of user A and user B using the public switched telephone network ("PSTN") and the configuration shown in FIG. 1. Users A and B each establish active connections to the Internet at 205. Upon establishing these connections, the computers for users A and B each receive an IP address if addresses are dynamically assigned. User A calls user B across the PSTN, establishing a telephone connection 210. An application or agent on computer 105 causes the IP address for user A's computer to be encoded by either the computer 105 or the attached phone 110 in a form that can be sent across the PSTN, 215. This encoding can be using a dual tone multi-frequency ("DTMF") coding. Instead of an IP address, the application or agent can supply a reference to the IP address of computer 105, such as an entry in a known directory.

User A sends the encoded IP address to user B's computer 115 across the PSTN 130, through user B's phone 120, 220. User A can send the IP address in various ways. For example, the IP address can be sent using DTMF signaling over the same channel as the user information (e.g., speech) or digitally encoded and sent along with caller ID through the telephone signaling channel. User A sends the encoded IP address for a computer network connection across the telephone network connection, a separate network from the computer network, so the signaling is "out-of-band signaling." In one implementation, a telephone can include a "SEND" button. When user A presses the SEND button, the telephone requests the IP address from the computer 105 through connection 107. The IP address can be provided in any format. The telephone then transmits the tones in a predetermined format such as hexadecimal encoding, using a mechanism such as DTMF encoding across the PSTN connection to user B's telephone.

An application program or agent executing on user B's computer detects the encoded IP address as the address. This is received at user B's telephone at 225. To facilitate this detection, the encoding can include a predefined flag to indicate an IP address. The agent decodes the IP address, 230. The agent establishes communications, such as by sending a network connection request, across the Internet using the decoded IP address for user A's computer to connect to user A's computer, 235.

Once the IP connection has been established, users A and B can continue to converse across the PSTN connection as well as run applications which utilize network connections. Examples of such applications include collaboration software, joint web browsing software, video, and network games.

Various alternative implementations are possible. For example, user A's telephone can send the encoded IP address for user A's computer as header information when the telephone connection is initially established, similar to information identifying user A's telephone (e.g., "caller ID"). When multiple users are connected across the PSTN, such as in a conference call, user A can cause the IP address for user A's computer to be sent to all or some of the users. These users can then select whether to establish an IP connection. User A can initiate the transmission of the IP address by executing an application which employs an IP connection, such as network collaboration software. Operations performed by the agent on user B's computer can alternatively be performed by an application program under the control of user B. Once the IP connection is established, the computers can open an Internet telephony connection and cause the PSTN connection to end.

Figure 3A:
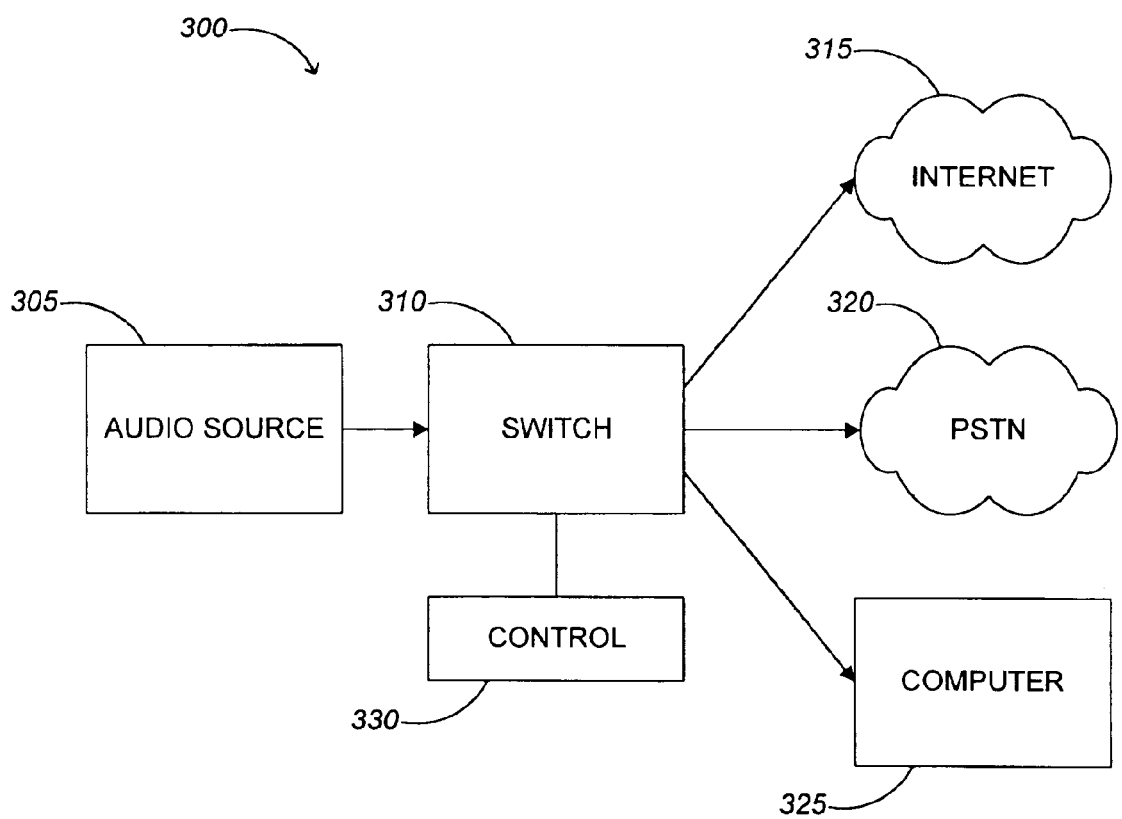
FIG. 3A is a block diagram showing an audio crossbar switch.

FIG. 3A is a block diagram 300 of a second embodiment. An audio source 305 is coupled to an audio crossbar switch 310. Audio source 305 supplies an audio signal to crossbar switch 310. Audio source 305 can be a telephone or some other audio source, such as a microphone, computer sound system, or a connection to a network. Crossbar switch 310 has output ports respectively coupled to a telephone network 315, such as the PSTN, a computer network 320, such as the Internet, and a computer 325. Output ports of crossbar switch 310 can be coupled to other devices as well, such as audio speakers or recording equipment. A control element 330 supplies control signals to crossbar switch 310 to cause crossbar switch 310 to output the audio signal from one or more of the output ports of crossbar switch 310.

In FIG. 3A, crossbar switch 310 is shown with one input port and three output ports. However, crossbar switch 310 can have more or less input ports and output ports. Control element 330 can cause crossbar switch 310 to connect any combination of available input ports to any combination of available output ports. In addition, input ports and output ports can support two-way signaling, so that, for example, crossbar switch 310 can send signals to and receive signals from computer 325. Alternatively, each input port or output port can provide a pair of couplings, one for input and one for output.

Figure 3B:
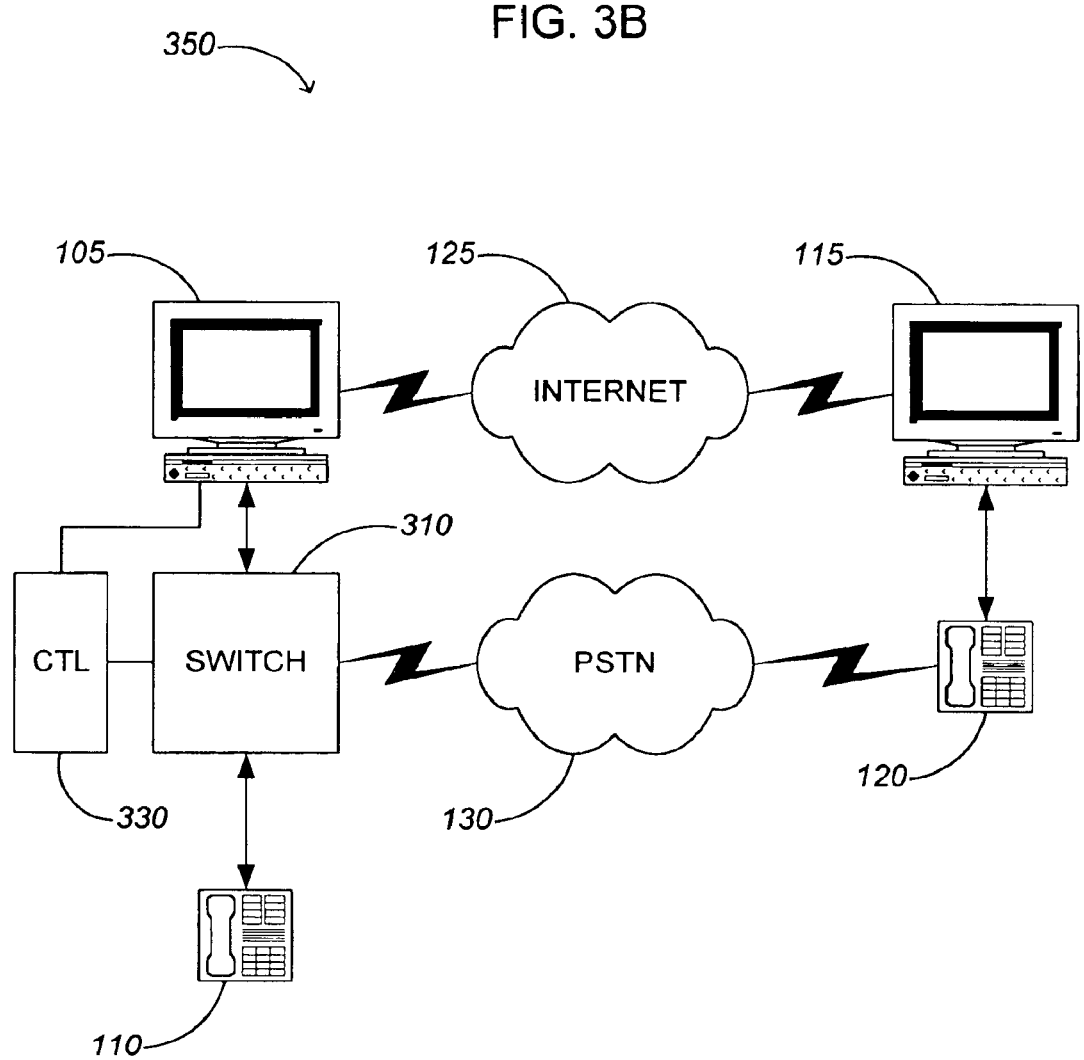
FIG. 3B is a block diagram showing a crossbar switch coupled to a computer.

FIG. 3B is a block diagram 350 showing a crossbar switch 310 coupled to a computer, such as computer 105 in FIG. 1. Telephone 110 is coupled to an input port of crossbar switch 310. Computer 105, and telephone network 130 are coupled to output ports of crossbar switch 310. Computer 105 is also coupled to control element 330. Crossbar switch 310 can be implemented as an internal component of computer 105 or telephone 110.

A user at telephone 110 can route audio signals from telephone 110 through crossbar switch 310 to any one or more of its output ports: telephone network 130, computer 105, and computer network 125 through computer 105. The user can command crossbar switch 310 to change the routing dynamically, without terminating a telephone connection. Crossbar switch 310 can preserve the telephone connection by establishing a second network connection before terminating the original network connection. For example, in one implementation, when the user has established a telephone connection across telephone network 130 and commands crossbar switch 310 to switch to a telephone connection across computer network 125, after the computer network connection has been established as described above, crossbar switch 310 connects the ports corresponding to telephone 110 and computer network 130 while maintaining the connection between the ports corresponding to telephone 110 and telephone network 125. After connecting the ports for telephone 110 and computer network 125, crossbar switch 310 ends the connection between the ports for telephone 110 and telephone network 130. Crossbar switch 310 can also route information from computer 105 and telephone network 130 to telephone 110, using the configurable two-way nature of the input ports and output ports.

In one example of operation, crossbar switch 310 can be used to support encrypting a conversation being sent across telephone network 130. A user speaks into telephone 110 and crossbar switch 310 sends the audio signal to telephone network 130. The user then activates encryption so that computer 105 adjusts control element 330. When the user speaks, crossbar switch 310 routes the audio signal to computer 105. Computer 105 encrypts the audio signal and returns the encrypted signal to crossbar switch 310. Crossbar switch 310 sends the encrypted signal to telephone network 130. Alternatively, the encrypted signal can be sent across computer network 125. Encryption is also described below.

In another example, crossbar switch 310 provides a transparent real-time shift from a telephone network connection to a computer network connection. A user at telephone 110 establishes a connection across telephone network 130. Crossbar switch 310 routes audio signals from telephone 110 to telephone network 130. The user also establishes a computer network connection, such as by the process described above for spontaneous IP connections. When the user activates an IP telephony application program on computer 105, computer 105 causes crossbar switch 310 to route the audio signals from telephone 110 to computer 105, without interrupting the telephone conversation. This operation can occur simultaneously with a switching of the voice stream on the other side of the network.

FIG. 4 is a flowchart 400 showing the process of encrypting an audio signal sent over a telephone connection, such as the PSTN, using a computer network connection, such as an IP connection, to facilitate the secure exchange of keys. Users A and B have access to computers and telephones configured as shown in FIG. 1. In one implementation, the computers include crossbar switches, as described above. Users A and B each establish active connections to the Internet, 405. As part of establishing these connections, the computers for users A and B each receive an IP address. User A calls user B across the PSTN, establishing a telephone connection, 410. Users A and B establish a peer to peer IP connection, 415, such as by the process described above and shown in FIG. 2.

User A then sends a secret key to user B across the IP connection, 420. The secret key is a cryptographic key for encrypting and decrypting information, such as a key for use with the data encryption standard ("DES") cryptography method. In one implementation, the secret key is generated by security hardware built into user A's computer. User A can send the secret key to user B using a digital envelope constructed with a public key cryptography method, such as the Rivest-Shamir-Adleman ("RSA") method. Thus, user A encrypts the secret key with user B's public key. User B decrypts the secret key using user B's private key. The cross bar switch is configured such that audio signals from the telephone is routed from the telephone to the computer.

Computer A encrypts the audio signal to be sent to user B using the secret key, 425. The encryption is transparent to user A. User A activates a security application program or agent and that agent encrypts audio signals received from user A's telephone. Computer A sends the encrypted signal to user B across the PSTN, 430. Computer B decrypts the encrypted signal using the secret key, 435. This decryption is also transparent to user B. User B activates a security application program or agent and that agent decrypts encrypted signals received at user B's telephone. An identical process can encrypt audio signals from User B to User A. Thus, once the secret key has been transferred across the IP connection, the users can converse across the PSTN connection while the computers encrypt and decrypt the users' audio signals.

FIG. 5 is a flowchart 500 showing authenticating a caller during a telephone connection across a telephone network, such as the PSTN, using a computer network connection, such as an IP connection. Users A and B have access to computers and telephones configured as shown in FIG. 1. Users A and B each establish active connections to the Internet at 505. As part of establishing these connections, the computers for users A and B each receive an IP address. User B calls user A across the PSTN, establishing a telephone connection, 510. Users A and B establish an IP connection, 515, such as by the process described above and shown in FIG. 2.

To authenticate user B, user A verifies that the telephone that user B is using at the remote end of the telephone connection is coupled to the computer at the remote end of the IP connection, 520. User A verifies this telephone-computer connection by sending a secret key signal across the PSTN and receiving the same signal back from user B across the IP connection. One example of this verification is described below with respect to FIG. 6. Once User A verifies that user B's computer is the computer that user B asserts, conventional digital certification across the IP connection can be deployed to verify the validity of user B's digital credentials, 525. If a device such as a smart card reader or a biometric identification device such as a fingerprint reader or retina scanner is configured on computer B, these can also be used as part of the identification validation process.

Figure 6:
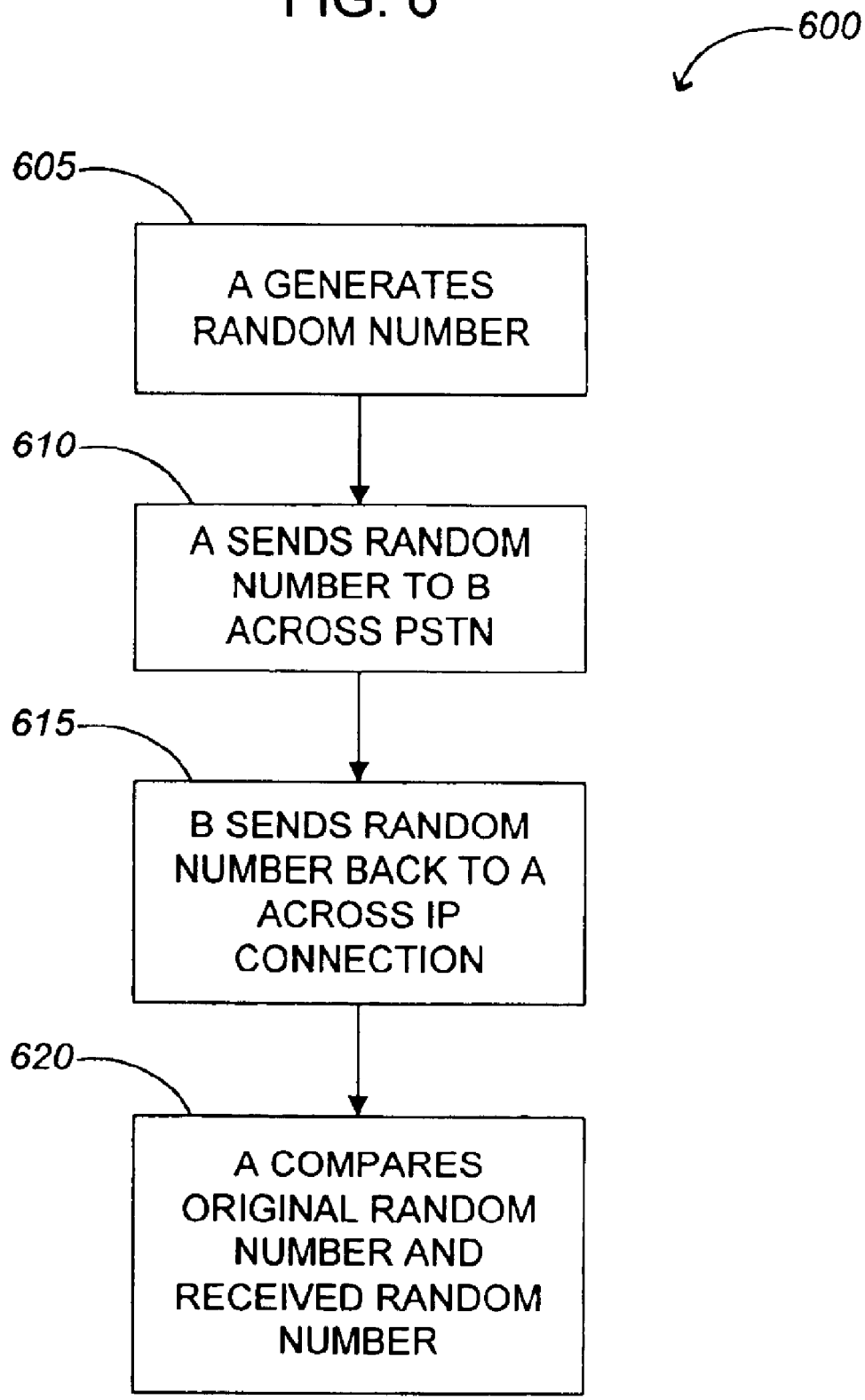
FIG. 6 is a flowchart of verifying the telephone-computer connection between user B's telephone and computer.

FIG. 6 is a flowchart 600 of verifying the telephone-computer connection between user B's telephone and computer. User A generates a secret key including a random number using user A's computer, 605. The random number can be generated by hardware. User A sends the random number to user B across the PSTN, 610, using a mechanism such as Hex encoding and DTMF signaling. User B returns the random number across the IP connection, 615.

User A compares the random number received over the Internet with the original random number sent over the PSTN, 620. If the Internet random number matches the original random number sent to user B, user A has verified that the telephone and computer of user B are coupled. This verification provides an additional level of security in transactions occurring across the PSTN. User A can verify that the caller has access to user B's computer using conventional digital certification. Using the technique described above, user A can also verify that the caller is using the telephone coupled to user B's computer. Authentication techniques continue to advance in fields such as biometrics. The ability to authenticate using a telephone connection provides a corresponding improvement in security.

In one implementation, a crossbar switch includes a switch that includes at least one analog input port, at least one digital input port, at least one analog output port, at least one digital output port, and a processor that generates digital signals based upon analog signals received in at least one analog input port. The crossbar switch also includes at least one analog input channel that receives an audio signal, in which each analog input channel is coupled to a corresponding analog input port of the switch.

The crossbar switch further includes at least one digital input channel, at least one analog output channel, at least one digital output channel, and a control element coupled to the switch. Each digital input channel is coupled to a corresponding digital input port of the switch, and each analog output channel is coupled to a corresponding analog output port of the switch. Also, each digital output channel is coupled to a corresponding digital output port of the switch. The control element is adapted to control which of the analog input ports, digital input ports, analog output ports, and digital output ports are active.

An active input port sends a signal received at the input port from a coupled channel into the switch. Furthermore, an active output port sends a signal from within the switch to a coupled channel, allowing a signal received at any input port of the switch to be sent to one or more channels coupled to corresponding output ports of the switch.

In one implementation, an audio crossbar switch includes multiple input ports and multiple output ports. One input port is coupled to an audio source. One output port is coupled to a telephone network, and one output port is coupled to a computer network. The audio crossbar switch also includes a control element which physically connects at least one input port to at least one output port and can dynamically change which input port is coupled to which output port. In one case, the audio source may be a telephone. In another case, the control element can change a connection between the audio source and the telephone network to a connection between the audio source and the computer network without terminating a telephone conversation occurring through the connection between the audio source and the telephone network.

The technique of the present disclosure may be implemented in hardware or software, or a combination of both. Portions of the technique can be implemented by means of a computer program executing on one or more programmable systems each comprising at least one processor, a data storage system (including volatile and non-volatile memory and/or storage elements), at least one input device, and at least one output device. Program code is applied to input data to perform the functions described herein and generate output information. The output information is applied to one or more output devices, in known fashion. The processor may comprise, for example, a general purpose processor or a digital signal processor (DSP).

Each program can be implemented in a high level procedural or object oriented programming language to communicate with a computer system although the invention is not limited in this respect. However, the programs can be implemented in assembly or machine language, if desired. In any case, the language may be a compiled or interpreted language.

Each such computer program can be stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Various implementations have been described. However, these implementations are examples and are not limiting. For example, the order of operations of the processes described is illustrative and alternative orders are possible. Both computers need not be connected to the computer network when the telephone connection is initially established. The "user" on one side of the connection can be automated, such as when a user calls a computer-controlled interactive voice response system, allowing a user to enhance interaction with a remote computer with graphical content. The encoding of an IP address can be performed within the telephone. Numerous security, cryptography, and authentication techniques, implemented in hardware and software, are well known and can be used. The voice network can be any voice system, including cellular or the like. This technique also applies to protocols other than IP. Addresses transmitted may or may not include associated application identifiers such as ports. The addresses transmitted might not be for the computer engaged in the transaction, but for a proxy on the network associated with the computer. The random number used for verifying the connection between a computer and a telephone can be encrypted. The technique can be used to verify a connection between devices other than computers and telephones.

What is claimed is:

1. A method of establishing a network connection, the method comprising:

establishing a connection across a first communication network configured to carry an audio signal, wherein the first communication network comprises a calling telephone and a receiving telephone;

encoding a computer network address for a second network different from the first network into an encoded network address and sending the encoded network address across the first network, wherein the second network comprises a calling computer and a receiving computer;

using the network address that is sent over the first network to establish a network connection on the second network;

maintaining the first connection across the first communication network while the second network connection is being established;

providing encryption capabilities, wherein providing the encryption capabilities comprise encrypting the audio signal using an encryption key; and verifying that the calling computer is coupled to the calling telephone by sending a signal from the receiving telephone to the calling telephone across the first communication network and sending the signal from the calling computer to the receiving computer across the second network, wherein verifying the calling computer is coupled to the calling telephone comprises:

generating a random number;

sending the random number to the calling telephone across the first communication network;

receiving an encrypted random number at the receiving computer across the second network;

decrypting the encrypted random number using a public cryptographic key; and comparing the random number with the decrypted random number.

2. The method of claim 1, further comprising:

transferring a secret key across at least one of the network connections; and allowing network users to converse across the first communication network while encrypting and decrypting audio signals for each user.

3. The method of claim 1, where the encoded network address is configured to be encoded using dual tone multi-frequency signals.

4. The method of claim 1, where the encoded network address is configured to be appended to telephone network signaling data.

5. The method of claim 1, wherein the second network comprises an Internet, wherein the computer network address comprises an Internet protocol address.

6. The method of claim 1, further comprising:

receiving a stream of audio signals;

sending the audio signals through the connection across the first telephone network prior to using the network address to establish a network connection; and sending the audio signals through the connection across the second network after using the network address to establish the network connection.

7. The method of claim 1, wherein the encryption capabilities further comprise:

receiving a stream of audio signals;

encrypting the audio signals using the calling computer that is connected to the second network to form encrypted audio signals; and sending the encrypted audio signals across the first communication network.

8. The method of claim 1, wherein the encryption capabilities further comprise:
   transmitting the encryption key across the second network;
   encrypting the audio signal using the encryption key to form an encrypted audio signal; and
   transmitting the encrypted audio signal across the first communication network.

9. The method of claim 1, wherein using the network address that is sent over the first network to establish a network connection on the second network comprises:
   translating the encoded network address to a computer network address.

10. The method of claim 1, further comprising:
    supporting simultaneous network connections for the first network and the second network.

11. A program stored on a machine-readable medium for establishing a network connection, the program including instructions operable to cause a machine to:
    establish a connection across a first communication network configured to carry an audio signal;
    encode a computer network address for a second network different from the first network into an encoded network address and send the encoded network address across the first network;
    use the network address that is sent over the first network to establish a network connection on the second network;
    maintain the first connection across the first communication network while the second network connection is being established;
    provide encryption capabilities, wherein providing the encryption capabilities comprise encrypting the audio signal using an encryption key; and
    verify that a calling computer is coupled to a calling telephone by sending a signal from a receiving telephone to the calling telephone across the first communication network and sending the signal from the calling computer to the receiving computer across the second network, wherein verifying the calling computer is coupled to the calling telephone comprises:
       generating a random number;
       sending the random number to the calling telephone across the first communication network;
       receiving an encrypted random number at the receiving computer across the second network;
       decrypting the encrypted random number using a public cryptographic key; and
       comparing the random number with the decrypted random number.

12. The method of claim 11, wherein the receiving computer comprises a computer-controlled interactive voice response system.

13. The method of claim 11, further comprising authenticating the calling computer.

14. A method of authenticating a telephone call between a calling telephone and a receiving telephone, the method comprising:
    establishing a connection across a voice communication network between the calling telephone and the receiving telephone;
    establishing a connection across a computer network between a calling computer and a receiving computer by using a computer network address sent on the voice communication network to establish the connection on the computer network; and
    verifying that the calling computer is coupled to the calling telephone by sending a signal from the receiving telephone to the calling telephone across the voice communication network and sending the signal from the calling computer to the receiving computer across the computer network where verifying the calling computer is coupled to the calling telephone comprises:
       generating a random number;
       sending the random number to the calling telephone across the voice communication network;
       receiving an encrypted random number at the receiving computer across the computer network;
       decrypting the encrypted random number using a public cryptographic key; and
       comparing the random number with the decrypted random number.

15. The method of claim 14, further comprising authenticating the calling computer.

16. The method of claim 14, where establishing a connection across a computer network comprises:
    encoding the computer network address into an encoded network address;
    sending the encoded network address across the voice telephone network; and
    receiving a network connection request to establish a connection across the computer network, where the network connection request uses the computer network address.

17. The method of claim 14, where establishing a connection across a computer network comprises:
    receiving the encoded network address across the voice telephone network;
    translating the encoded network address to a computer network address; and
    sending a network connection request to establish a connection across the computer network, where the network connection request uses the computer network address.

18. A method of authenticating a telephone call between a calling telephone and a receiving telephone, the method comprising:
    establishing a connection across a voice communication network between a calling telephone and a receiving telephone;
    establishing a connection across a computer network between a calling computer and a receiving computer; and
    verifying that the receiving computer is coupled to the receiving telephone by sending a signal from the calling telephone to the receiving telephone across the voice communication network and sending the signal from the receiving computer to the calling computer across the computer network, wherein verifying the receiving computer is coupled to the receiving telephone comprises generating at least one random number to send to the receiving telephone across the voice telephone network and comparing the at least one random number to a random number received at the calling computer across the computer network.

19. A method of authenticating a telephone call between a calling telephone and a receiving telephone, the method comprising:

establishing a connection across a voice communication network between the calling telephone and the receiving telephone;

establishing a connection across a computer network between a calling computer and a receiving computer by using a computer network address sent on the voice communication network to establish the connection on the computer network; and verifying that the calling computer is coupled to the calling telephone, wherein the verifying comprises:

generating a random number;

sending the random number to the calling telephone across the voice communication network;

encrypting the random number at the calling computer;

sending the random number from the calling computer to the receiving computer;

decrypting an encrypted random number sent by the calling computer across the computer network using a public cryptographic key; and comparing the random number with the decrypted random number to enable the receiving computer to verify that the calling computer is coupled to the calling telephone.

20. A method comprising:

establishing a connection across a voice communication network using a receiving telephone;

establishing a connection across a computer network with a receiving computer by using a computer network address sent on the voice communication network to establish the connection on the computer network; and sending a signal from the receiving telephone across the voice communication network and sending the signal to the receiving computer across the computer network, wherein the sending comprises:

generating a random number at the receiving computer;

sending the random number across the voice communication network;

receiving an encrypted random number at the receiving computer across the computer network;

decrypting the encrypted random number using a public cryptographic key; and comparing the random number with the decrypted random number.

\* \* \* \* \*